Figure 1:
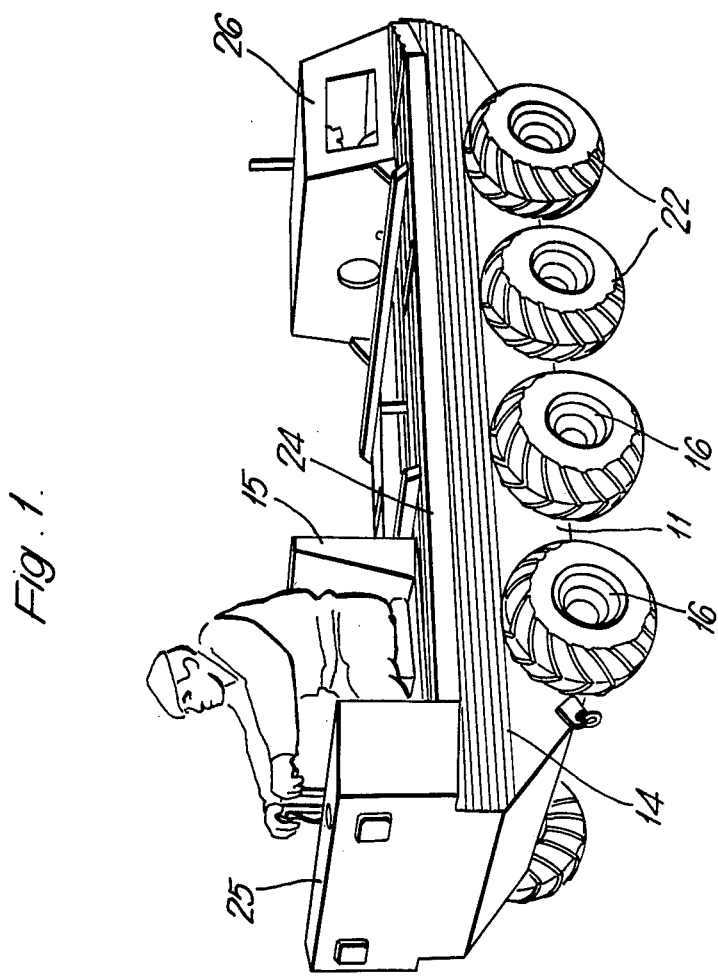

United States Patent [19]

Somerton-Rayner

[11] 4,274,502
[45] Jun. 23, 1981

[54] ALL-TERRAIN AMPHIBIOUS VEHICLE

[76] Inventor: Michael Somerton-Rayner, Thatchway, Quarley, Nr. Andover, Hampshire, England

[21] Appl. No.: 26,692

[22] Filed: Apr. 3, 1979

[51] Int. Cl.³ .................................................. B62D 11/02
[52] U.S. Cl. ................................. 180/6.2; 180/24.05; 180/24.08; 180/24.12; 280/797
[58] Field of Search ................. 180/6.2, 24.08, 24.12; 280/797

[56] References Cited

U.S. PATENT DOCUMENTS

| | | | |
|---|---|---|---|
| 2,800,188 | 7/1957 | Garrett | 180/6.2 |
| 2,821,949 | 2/1958 | Uyehara | 180/24.08 |
| 3,001,601 | 9/1961 | Aghnides | 180/6.2 |
| 3,052,311 | 9/1962 | Leedom | 180/24.08 |
| 3,367,436 | 2/1968 | Fox | 180/24.08 |
| 3,444,837 | 5/1969 | Donofrio | 180/6.2 |
| 3,485,313 | 12/1969 | Rieli | 180/6.2 |
| 3,572,454 | 3/1971 | Siren | 180/6.2 |

OTHER PUBLICATIONS

"Automotive Digest", 8/1953, pp. 83–94.

Primary Examiner—John P. Silverstrim
Attorney, Agent, or Firm—Howard L. Rose

[57] ABSTRACT

An automotive vehicle is provided, for use inter alia as a mobile anti-tank guided missile-firing platform, which is sufficiently inexpensive to be expendable in battle and can be readily carried by a helicopter. The vehicle has a main frame comprising a pair of longitudinal closed box section members joined to form a ladder construction by a cross member and having strong points for the mounting of an engine and gearbox. The ground wheels, which lean outwards by about 5 degrees, are mounted on stub axles journalled in the box section members and are all driven by chains housed in oil baths within the box section members. Steering is accomplished by braking the transmission on one side or the other. The wheel tires are low pressure raw hide tires. The closed box section members project below the body of the vehicle and have toboggan-shaped ends to act as runners in snow. The body of the vehicle is constructed as a waterproof box to give buoyancy. The front and back wheels are higher on the frame than the center wheels.

9 Claims, 7 Drawing Figures

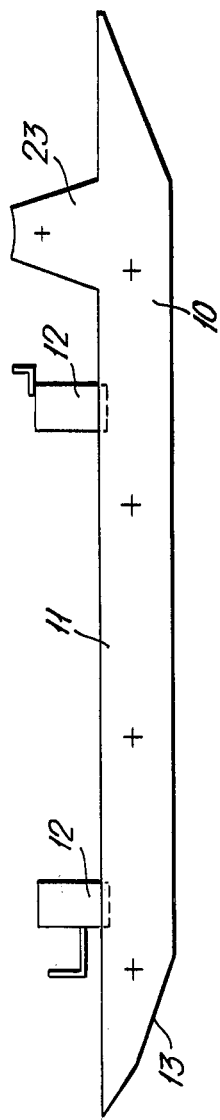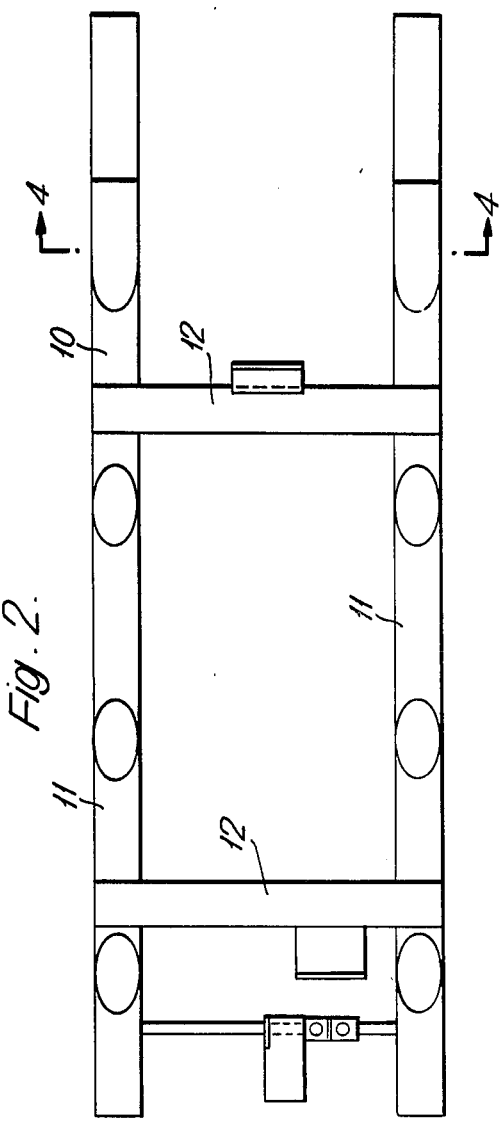

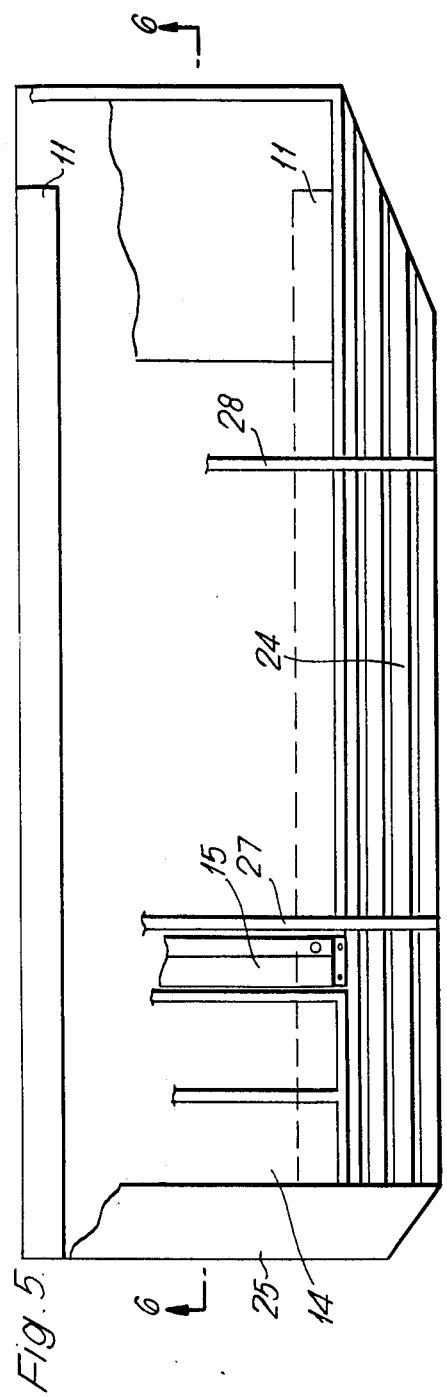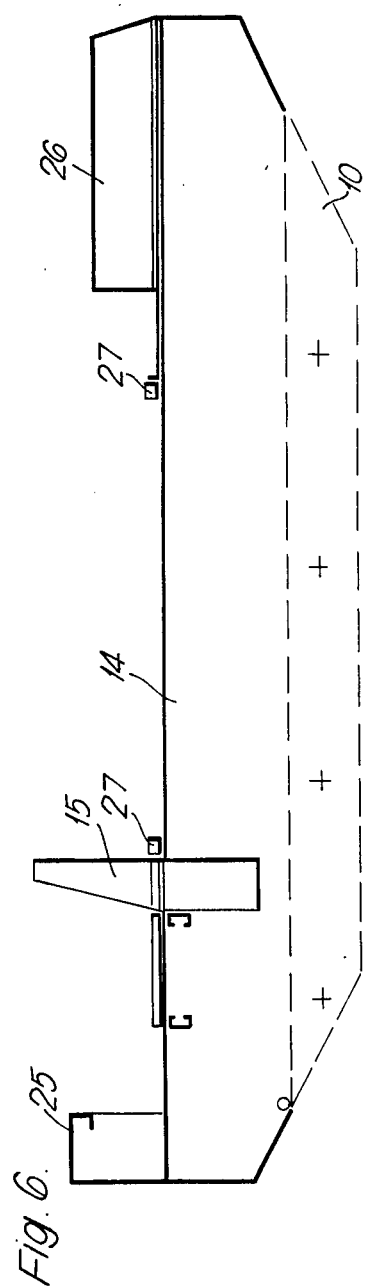

ALL-TERRAIN AMPHIBIOUS VEHICLE

This invention relates to vehicles, and has as a special object the provision of an all-terrain amphibious automobile vehicle that can be employed inter alia as a mobile anti-tank guided missile-firing platform which is sufficiently inexpensive to be expendable in battle and can be carried by a helicopter.

Hitherto, more or less conventional vehicles have been employed as a mobile missile-firing platforms with the disadvantages that the vehicle carrying the missile system cannot be transported by helicopter and the vehicle itself, which becomes a comparatively vulnerable target in battle, is too costly to be classed as expendable. The present invention overcomes these disadvantages of previous vehicles when used for this duty.

According to the invention, a mobile platform is built upon a main frame or chassis comprising a pair of longitudinal closed box section members joined to form a ladder construction by cross members and having strong points for the mounting of an engine and gearbox, the box section members having journalled therein projecting stub axles carrying the ground wheels all of which are driven through chain drives housed within the box sections, and steering being accomplished by braking one side or the other of the transmission in the manner of a tracked vehicle.

In the preferred form, the box section members provide oil baths for the chains therein, project below the hull or body of the vehicle and have toboggan-shaped ends, so that they can act as runners when the vehicle is required to travel in snow or similar conditions. The closed box sections may also give the vehicle buoyancy in an amphibious mode.

Figure 4:
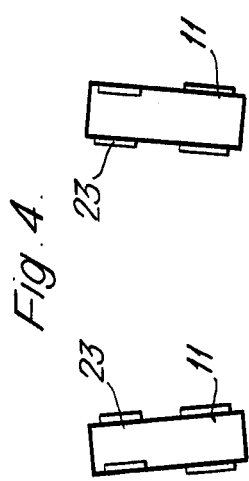
Figure 7:
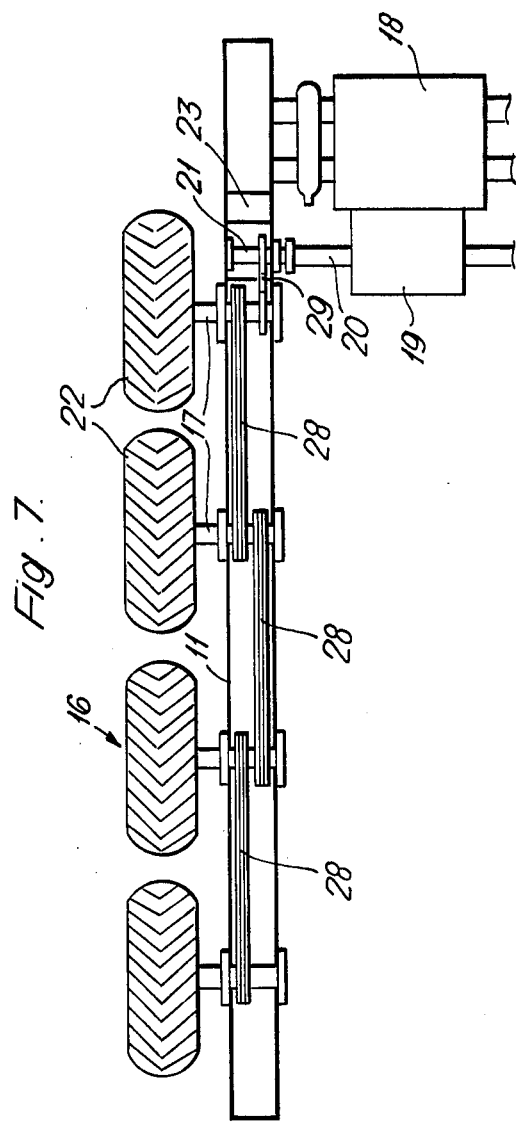

One arrangement of vehicle according to the invention will now be described, by way of example, with reference to the accompanying drawings, in which:

FIG. 1 is a perspective view of the complete vehicle,

FIGS. 2 and 3 are, respectively, a diagrammatic plan and side elevation of the main frame of the vehicle, FIG. 4 is a view in section on the line 4—4 of FIG. 2, FIG. 5 is a partial plan of the body of the vehicle, FIG. 6 is a view in section on the line 6—6 of FIG. 5, and FIG. 7 is a diagrammatic part plan of the vehicle driving arrangements.

The vehicle to be described is an eight-wheeled all-terrain amphibious vehicle designed primarily for military use as a light-weight missile carrier. It is intended to be low-cost operationally-expendable transport for both crew, the missile system and its associated equipment. It is also designed to operate in all temperature ranges in all countries of the world barring the extreme Arctic.

The main frame 10 of the vehicle (FIGS. 2-4) is in the form of a ladder construction built in heavy gauge aluminium alloy of box section, and comprising a pair of longitudinal boxes 11 connected by two cross-struts 12. The boxes 11 have a number of functions:

a. To form the chassis structure of the vehicle.
b. To carry the wheel stub axles and form the container for triplex chain drives.
c. To form an oil bath for the lubrication of the chain drives.
d. The bottoms 13 of the boxes 11 are toboggan-shaped at the front and rear end and stand proud of the hull to form sledge runners to support the vehicle in deep snow when the wheels would then act as driving paddles.
e. The side members of the chassis are inclined outward 5 degrees from the vertical in an upward direction to impart a 5 degree slope to the stub axles 17 and therefore an outward lean to the wheels of 5 degrees relative to the verticle axis of the vehicle. This is important to ensure that the vehicle will run in a straight line without continual adjustment to the steering brakes to achieve straight line running; i.e. to prevent wandering of the vehicle.

The body 14 (FIGS. 5 and 6) is integrally welded to the ladder chassis 11, 12 to form a waterproof 'box'. The fuel tank 15 is a welded aluminium tank which also forms the seat back for the crew of 2. It is designed to hold 23 gallons. The fuel tank and the control system pipes are built into the body. The body has side decks 24 running along each side and overhanging the wheels, a front console 25 behind which the crew members sit, and a rear engine cover 26.

A removable water propulsion unit can be fitted to each side of the rear of the body. It is fitted just before water operations are required and removed immediately on leaving the water.

The vehicle's eight wheels 16 are all driven. The centre two wheels at each side have their axes in a plane containing the horizontal centre line of the chassis side members 11. The rear wheels are set up 5 degrees from that center line and the forward pair of wheels are set up 10 degrees from that centre line. This forms a banana-shaped profile to the ground line of the wheels and is to facilitate easier steering/slewing when the vehicle is on difficult surfaces such as hard concrete where the rawhide generally annular tires 22 impart considerable resistance when steering by slewing. The tire pressure is low enough for the machine to cross a minefield without detonating the mines. The wheels can also be fitted with tracks which will maintain extremely good floatation over snow but it is not considered that tracks would be necessary in any other condition.

The vehicle has a power-weight ratio of 64 brake horse power per ton and is capable of climbing and descending hills of 45 degrees. It is also capable of stopping and restarting without stalling or damaging the engine and transmission.

The vehicle is further capable of:
(i) negotiating a transverse slope of 45 degrees;
(ii) fording through water to a depth of 75 cms with entry and exit angles of 30 degrees;
(iii) amphibious operations with water propulsion units fitted;
(iv) negotiating slope approach angles of 45 degrees;
(v) climbing over vertical obstacles not greater than 0.3 meter in height;
(vi) 30 mph across country and 50 mph on road;
(vii) executing skid turns but is not able to do a neutral turn.

The vehicle is steered by means of disc caliper brakes which are operated hydraulically from manual master cylinders under direct control of the driver. The steering characteristics are therefore that of a tracked armoured vehicle. Additional controls are the throttle which incorporates an automatic choke, ignition and starter switch, and lighting switch. An automatic gearbox and a torque converter incorporating one reverse gear is standard, controlled by a selector lever.

The engine is an 1800 cc Volkswagen air-cooled 4 stroke unit 18 (FIG. 7) coupled to a Volkswagen automatic gearbox 19. Secondary transmission is via modified Volkswagen constant velocity drive shafts 20 coupled to half shafts 21 set into upward extensions 23 of the chassis members 11 towards the rear ends thereof. The half shafts 21 carry the steering brake discs and the steering brake calipers, and the drive is transmitted from them to the No. 4 axle 17 by first triplex chains 29. Further triplex chains 28 continue the drive successively from the No. 4 axle through to No. 3, 2 and 1 axles.

The vehicle is designed to run on the lowest grade of petrol (gasoline) normally referred to in the United Kingdom as 2-star, e.g. 93 octane to BS 4040. The engine is air-cooled and is shown by its manufacturers to operate satisfactorily in temperatures from 45° C. to minus 35° C. The engine has been proved to have a working life of approximately 100,000 miles on the road. The oil is normal motor oil in the region of 10-30 sae. Hydraulic oil is of an ordinary commercial quality.

The vehicle is primarily to be used over rough terrain and is designed with a factor of safety of 2 taking into account the loads expected in this environment. The vehicle is designed with a training role in mind and to this end a life of 20,000 miles and 5 years in the training role has been built in so that the operational life of such a vehicle in its expendable concept would not approach this figure. The vehicle is designed in battle to last for six battlefield days; however, with the training requirement taken into account, the vehicle is designed to last for 5 years or 20,000 miles with normal maintenance and a chain change at approximately 10,000 miles and brake and tire changes more frequently dependent upon the ground over which the vehicle is driven.

Since the vehicle is to be suitable for the carriage of an anti-tank weapon system, strong points 27 are built into the frame to carry the system. The vehicle is also designed to be used as an eight man patrol carrier and with the removal of the side valences of the hull the vehicle can also be employed as a radio-controlled agile land target.

The noise level is low being well below 85 d b a.

The vehicle is designed to carry a load of 2,000 lbs. in overload conditions and normally 1,600 lbs. in its operational weight condition. The basic weight of the vehicle is 1,150 lbs. The C of G of the vehicle is central when the front seats are occupied by two persons. The ground pressure of the vehicle is less than 5 lbs. p s i.

The vehicle is constructed of Marine specification aluminium alloy all welded to form an integral structure of the ladder chassis and the body. The body can be supplied in amphibious, non-amphibious or stripped down form depending on requirements. The fuel tank is of a drop-in nature forming the seat back and is made of aluminium alloy but could be made self-sealing. The vehicle construction is such that it is capable of operating in snow, extremely wet conditions, or conversely, it is also fitted with seals to operate satisfactorily in dust and sand without any detriment to the machinery. In extreme dust conditions extra dust filters can be fitted.

The vehicle is designed to be carried under a helicopter and has 4 strop lifting hard points built in. It is also designed to be stacked 3 high for transportation in a Hercules aircraft and is suitable for transportation in unpressurised aircraft flying at altitudes up to 16,000 feet. The vehicle is capable of operating itself at altitudes up to 8,000 feet.

The chains are designed to last half the life of the vehicle. In view of the method of steering, it is not thought that the rawhide tires will survive more than 2,000 miles when running on road. However, on grass the life expectancy will be considerably more than this.

The vehicle is built completely of non-corrosive alloys and therefore, the storage of the vehicle will only require the inhibiting of the engine. The remainder of the transmission being in oil is self-inhibiting.

What I claim is:

1. An automotive vehicle having a chassis comprising a pair of longitudinal closed box-section members and cross members connecting said longitudinal members, first fixed stub axles for ground wheels journalled in a first of said longitudinal members and second fixed stub axles for ground wheels journalled in a second of said longitudinal members, with a first set of ground wheels mounted on said first stub axles at one side of the vehicle and a second set of ground wheels mounted on said second stub axles at the opposite side of the vehicle, said wheels having generally annular shaped tires mounted thereon, an engine mounted on said chassis, first transmission means connecting said engine in driving connection with a stub axle on one side of the vehicle, second transmission means connecting said engine in driving connection with the corresponding stub axle on the other side of the vehicle, a first set of drive chains interconnecting said first stub axles inside the first of said longitudinal members, a second set of drive chains interconnecting said second stub axles inside the second of said longitudinal members, and steering means for steering the vehicle by differentially varying the speeds of rotation of said two sets of ground wheels, said stub axles projecting laterally outward from said longitudinal members and being inclined somewhat downward whereby said ground wheels have an outward lean.

2. A vehicle according to claim 1, wherein the box section members provide oil baths for the chains therein.

3. A vehicle according to claim 1, wherein the box section members project below the body of the vehicle and have toboggan-shaped ends, to act as runners in snow or similar conditions.

4. A vehicle according to claim 1, further comprising a vehicle body secured to the chassis and constructed as a water-proof "box" to give buoyancy.

5. A vehicle according to claim 1, wherein the wheels are arranged to lean outwards by substantially 5 degrees.

6. A vehicle according to claim 1 wherein the tires are low pressure rawhide tires.

7. A vehicle according to claim 1, wherein said ground wheels comprise front wheels, back wheels and centre wheels and the front and back wheels are mounted higher on said chassis than the centre wheels.

8. A vehicle according to claim 1, wherein each said longitudinal member has an upward extension in the region of one stub axle and said transmission means comprise half shafts journalled in said upward extensions and a chain drive within each said extension connecting the respective half shaft to said one stub axle.

9. An automotive vehicle having
 a chassis having first and second longitudinally extending frame members each disposed along a different side of said vehicle,
 a first set of fixed stub shafts each mounted along said first frame member, a second set of fixed stub shafts each mounted along said second frame member,
a ground engaging wheel mounted on each of said stub shafts,
a generally annular tire mounted on each said ground engaging wheel,
means for rotating said wheels mounted on said first set of stub shafts at the same rates of rotation,
means for rotating said wheels mounted on said second set of stub shafts at the same rates of rotation,
means capable of controlling the relative rates of rotation of said wheels associated with said first and said second sets of stub shafts whereby to steer said vehicle, and
means for reducing wandering of said vehicle,
said means for reducing including means for angling said wheels inward and downward at an angle of approximately 5 degrees from the vertical axis of said vehicle.

* * * * *